2,785,107

PARTIAL ENZYMATIC HYDROLYSIS OF STEROIDAL SAPONINS

Merle M. Krider, Philadelphia, and Monroe E. Wall, Oreland, Pa., assignors to the United States of America as represented by the Secretary of Agriculture No Drawing. Application January 28, 1954, Serial No. 406,907

1 Claim. (Cl. 195—32)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to steroidal saponins and to improved methods of isolating such saponins and the sapogenins contained therein from plant extracts.

By steroidal saponins we mean compounds having the following molecular skeleton

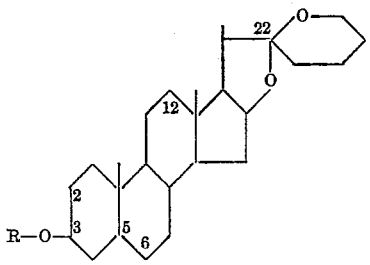

wherein R represents a side chain made up of two or more sugar moieties and the rest of the formula represents the skeleton of a steroidal sapogenin. Hydroxyl or carbonyl groups may be present at positions 2, 6 or 12 while isomers may occur through variations in the spatial configurations at positions 5 and 22.

Steroidal saponins are typically water-soluble while the corresponding sapogenins are highly insoluble. Accordingly, the usual method for isolation of such sapogenins from plant tissue is to extract the saponin from the tissue with water or an aqueous solvent, hydrolyze the saponin by prolonged boiling with strong acid (2 normal or stronger), and then isolate the liberated sapogenin which is precipitated. The greatest objection to this procedure is that large volumes of water are required for extraction of the saponin so that in the acid hydrolysis step either an excessive amount of acid is required to achieve the necessary acid strength or else the solution must be extensively concentrated—a tedious and expensive operation. Another objection is that in the prolonged boiling of the highly acidified saponin solution great quantities of resins, tars, plant pigments and other extraneous matter are precipitated along with the desired sapogenin, making isolation and purification of the latter extremely difficult.

It is an object of this invention to provide an improved process for isolating steroidal sapogenin from plant tissue. Another object is to provide a convenient and economical method for partially hydrolysing the sugar sidechain of steroidal saponin, thus to obtain a saponin having a shortened sugar side-chain and which is insoluble in water.

In our copending application entitled "Enzymatic Hydrolysis of Steroidal Saponins," filed October 10, 1952, Serial No. 314,231, which has matured into Patent No. 2,686,752, granted August 7, 1954, we have shown that most steroidal saponins can be completely hydrolyzed to yield the sapogenin by the action of plant enzymes obtained from the same or other saponin-bearing plants. An exception to this is the steroidal sapogenin called sarsasapogenin. Its glycosides, which we will call sarsasaponins, are found in many species of Yucca. The enzymes occurring in Yucca and other sapogenaceous species are incapable of cleaving sarsasaponins so as to liberate sarsasapogenin in a practical yield.

Several of the Yucca species containing sarsasaponins are utilized commercially for the production of fiber. In the production of fiber, a pulpy byproduct containing sarsasaponins is obtained in large quantities. Since sarsasapogenin is a valuable starting material from which progesterone and cortisone may be synthesized, this byproduct has considerable potential value. Heretofore, however, no economical process for the isolation of sarsasapogenin from such material has been available and it has accordingly been discarded.

According to the invention, aqueous solutions of extracts of Yucca plants containing sarsasaponins are held at or near room temperature for at least several hours, during which a precipitate is formed. The precipitated material is neither the saponin nor the sapogenin, but rather is a partially hydrolyzed saponin wherein the sugar side-chain has been shortened, probably to a single unit. This partial removal of the hydrophylic sugar sidechain is sufficient to render the residue insoluble in water. This precipitate is easily isolated from the aqueous extract in a relatively pure and highly concentrated form and may subsequently be further hydrolyzed to sarsasapogenin by boiling with a relatively small volume of strong acid, such as 2 N hydrochloric or sulfuric acid. In this process the strong acid hydrolysis step comes after separation from the bulk of the extraneous materials that, if present, would form troublesome tars and resins, and also after separation of the desired saponins from the great volume of extract obtained in the initial extraction step. Thus, isolation of relatively pure sarsasapogenin is enormously facilitated and the cost is correspondingly reduced, making it economically feasible to isolate sarsasapogenin from the pulpy byproduct of the Yucca fiber industry.

Little is known about the sugar moieties present in sarsasaponins, but without exception we have found that the aqueous Yucca tissue extracts containing sarsasaponins also contain an enzyme or enzymes capable of hydrolyzing enough of the sugar to render the residual saponin insoluble in water. Since this is an enzymatic reaction, the usual precautions are required to avoid inactivation of the enzyme. Thus, temperatures above about 40 to 50° C. should be avoided, as well as other conditions and reagents known to inactivate enzymes or denature proteins.

The following examples further illustrate the practice of the invention:

*Example I*

Five kilograms of freshly ground leaves of *Yucca schidigera* were mixed with 15 l. of water, pressed in a cider press, reextracted with 5 l. of water and again pressed. The combined aqueous extracts were clarified by centifuging and were then layered with toluene and left at 30° C. for 6 days, during which the pH changed from 4.85 to 4.65. There was negligible growth of microorganisms. During the 6 day period a precipitate gradually formed and at the end of the period this precipitate was collected by centrifuging the suspension. This precipitate was found to contain very little sapogenin and consisted mostly of partially hydrolyzed saponin. After being dried it amounted to 110 g.

Sarsapogenin was obtained from the partially hydrolyzed saponin by subjecting it to conventional strong acid hydrolysis. It was boiled 4 hours with 2 N hydrochloric acid, washed with water and dried to yield 35 g. of sarsasapogenin.

The water-soluble saponin remaining in the original aqueous extract was isolated by extraction with butanol. After hydrolysis it yielded 17 g. of sarsasapogenin. Thus, about two-thirds of the original sarsasaponin was partially hydrolyzed by the enzyme to form the insoluble intermediate saponin.

*Example II*

By proceeding substantially as in Example I except that *Yucca baccata* or *Y. elata* was used instead of *Y. schidigera,* a major part of the sarsasaponin in the aqueous extracts was partially hydrolyzed enzymatically to an intermediate insoluble saponin which was then treated with strong mineral acid to yield sarsapogenin in good yield. The process of the invention is similarly applicable to the other Yucca species that yield sarsasaponins.

We have observed that certain sarsasaponins obtained from Yuccas are fully hydrolyzed to a small extent by the enzymes present in the extract so that a low yield of sarsasapogenin is obtained without the acid hydrolysis step being carried out. This is of no importance, since any small amount of sapogenin liberated is carried through the later steps of the process and is fully isolated in the final product.

We claim:

A process for producing sarsasapogenin comprising extracting Yucca plant tissue containing sarsasaponin and an active naturally occurring enzyme with water at a temperature of about from 20° to 50° C., storing the aqueous extract at a temperature of about 20° to 50° C. for a time of about from 1 to 6 days to form a partially hydrolyzed, water-insoluble sarsasaponin precipitate from the aqueous extract, and completing the hydrolysis of the sarsasaponin by boiling the precipitate for several hours with a strong aqueous mineral acid of about 2-normal concentration to liberate sarsasapogenin.

References Cited in the file of this patent

UNITED STATES PATENTS

| | | |
|---|---|---|
| 2,069,687 | Stoll et al. | Feb. 2, 1937 |
| 2,686,752 | Wall et al. | Aug. 17, 1954 |